United States Patent
Shin

(10) Patent No.: US 11,453,178 B2
(45) Date of Patent: Sep. 27, 2022

(54) DISPLAY APPARATUS AND METHOD FOR MANUFACTURING SAME

(71) Applicant: Samsung Display Co., Ltd., Yongin-Si (KR)

(72) Inventor: Ju-hyun Shin, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 409 days.

(21) Appl. No.: 16/573,330

(22) Filed: Sep. 17, 2019

(65) Prior Publication Data
US 2020/0015368 A1    Jan. 9, 2020

Related U.S. Application Data

(62) Division of application No. 15/145,266, filed on May 3, 2016, now abandoned.

(30) Foreign Application Priority Data

Oct. 2, 2015    (KR) .......................... 10-2015-0139214

(51) Int. Cl.
*B29C 65/48*    (2006.01)
*B32B 37/12*    (2006.01)
(Continued)

(52) U.S. Cl.
CPC .......... *B29C 65/4845* (2013.01); *B32B 37/12* (2013.01); *G02F 1/133512* (2013.01);
(Continued)

(58) Field of Classification Search
CPC ...... G06F 3/0446; G06F 3/041; G06F 3/0412; G06F 3/0443; G06F 2203/04103;
(Continued)

(56) References Cited

U.S. PATENT DOCUMENTS 10,712,604 B2 *    7/2020    Ni .......................... G02F 1/1341
2005/0026072 A1    2/2005    Srinivasa ............... G03C 1/685
430/270.1
(Continued)

FOREIGN PATENT DOCUMENTS

KR    10-20140070109    6/2014
KR    1020140098147 A    8/2014
(Continued)

OTHER PUBLICATIONS

Machine translation of KR 20140098147 date uknown.*
(Continued)

*Primary Examiner* — John L Goff, II
(74) *Attorney, Agent, or Firm* — Cantor Colburn LLP

(57) ABSTRACT

A display apparatus includes a window member, a display module, and a photocured adhesive layer. The window member includes a base member and a bezel layer overlapping a partial region of a rear surface of the base member, the bezel layer including a photosensitive material having a reduced transmittance with an increased amount of irradiated light. The display module is disposed on the lower side of the window module. The photocured adhesive layer is configured to bind the window member to the display module, and overlaps with the bezel layer on a plane.

7 Claims, 12 Drawing Sheets

(51) Int. Cl.
*H04M 1/02* (2006.01)
*G02F 1/1335* (2006.01)
*G06F 3/041* (2006.01)
*G06F 3/044* (2006.01)
*H05K 5/00* (2006.01)
*G02F 1/1333* (2006.01)
*B29D 11/00* (2006.01)

(52) U.S. Cl.
CPC ............ *G06F 3/041* (2013.01); *G06F 3/0412* (2013.01); *G06F 3/0443* (2019.05); *G06F 3/0446* (2019.05); *H04M 1/0266* (2013.01); *H05K 5/0017* (2013.01); *B29C 65/48* (2013.01); *B29C 65/483* (2013.01); *B29C 65/4805* (2013.01); *B29D 11/0073* (2013.01); *B29D 11/0074* (2013.01); *B32B 2037/1253* (2013.01); *B32B 2305/55* (2013.01); *B32B 2310/0806* (2013.01); *B32B 2457/20* (2013.01); *B32B 2457/202* (2013.01); *B32B 2457/206* (2013.01); *B32B 2457/208* (2013.01); *C09J 2203/318* (2013.01); *C09K 2323/05* (2020.08); *C09K 2323/06* (2020.08); *G02F 1/133308* (2013.01); *G02F 1/133325* (2021.01); *G02F 1/133331* (2021.01); *G02F 1/133388* (2021.01); *G02F 2202/023* (2013.01); *G06F 2203/04103* (2013.01); *G06F 2203/04111* (2013.01)

(58) Field of Classification Search
CPC ..... G06F 2203/04111; G02F 1/133512; G02F 1/133308; G02F 1/133325; G02F 1/133331; G02F 1/133388; G02F 1/133516; G02F 2202/023; H04M 1/0266; H05K 5/0017; B29C 65/48; B29C 65/4805; B29C 65/483; B29C 65/4845; B29C 65/1406; B29C 65/1409; B29C 65/1435; B29C 65/1488; B29D 11/0073; B29D 11/0074; B32B 37/12; B32B 2037/1253; B32B 2305/55; B32B 2310/0806; B32B 2310/0831; B32B 2457/20; B32B 2457/202; B32B 2457/206; B32B 2457/208; C09J 2203/318; C09K 2323/05; C09K 2323/06; C09D 11/101

USPC ...................................................... 156/275.3
See application file for complete search history.

(56) References Cited

U.S. PATENT DOCUMENTS

| 2007/0081118 | A1* | 4/2007 | Lee | .................. G02F 1/133516 349/153 |
|---|---|---|---|---|
| 2011/0261282 | A1 | 10/2011 | Jean | .................. G02F 1/133308 349/58 |
| 2012/0165465 | A1 | 6/2012 | Kim | .................. C08G 18/6674 524/590 |
| 2012/0287066 | A1* | 11/2012 | Yang | ..................... G06F 1/1643 345/173 |
| 2014/0145973 | A1 | 5/2014 | Jeon | ........................ G06F 3/041 345/173 |
| 2015/0029416 | A1 | 1/2015 | Lee | ....................... G06F 3/0412 349/12 |

FOREIGN PATENT DOCUMENTS

| KR | 10-20150012941 | 2/2015 | |
| KR | 20-0388402 | 6/2015 | |
| WO | WO-2014029062 A1 * | 2/2014 | ............. B32B 37/06 |

OTHER PUBLICATIONS

Delbaere et al., NMR studies of the structure of the photoinduced forms of photochromic spironaphthoxazines, J. Chem. Soc., Perkin Trans. 2, 1997, 1499-1501.

Examination report dated Sep. 28, 2021 from the Korean Patent Office in respect of the Korean Patent Application which corresponds to U.S. Appl. No. 16/573,330.

* cited by examiner

DISPLAY APPARATUS AND METHOD FOR MANUFACTURING SAME

This application is a divisional application of U.S. application Ser. No. 15/145,266, filed on May 3, 2016, now abandoned which claims priority to Korean Patent Application No. 10-2015-0139214, filed on Oct. 2, 2015, and all the benefits accruing therefrom under 35 U.S.C. § 119, the content of which in its entirety is herein incorporated by reference.

BACKGROUND

The present disclosure relates to a display apparatus and a method for manufacturing the same, and more particularly, to a display apparatus including a photosensitive material and a method for manufacturing the same.

Electronic devices such as smartphones, digital cameras, lap top computers, navigational devices, and smart televisions, include components such as a display apparatus, communication modules, cameral modules, control circuit modules, and protecting covers, etc. The display apparatus may include a display module and a window member. The display apparatus binds to a protecting cover.

The window member and protecting cover of the display apparatus constitute an exterior face of an electronic device. The protecting cover protects the communication module, camera module, and control circuit modules from the outside. The window member provides a touch surface. It would be beneficial to provide display apparatus with improved properties.

SUMMARY

The present disclosure provides a display apparatus having a reduced defective rate.

The present disclosure also provides a display apparatus having enhanced manufacturing efficiency.

An exemplary embodiment provides a display apparatus including a window member, a display module, and a photocured adhesive layer. The window member includes a base member and a photocured bezel layer overlapping a partial region of a rear surface of the base member, the photocured bezel layer including a photocured photosensitive material having a reduced transmittance with an increased amount of irradiated light. The display module is disposed on the lower side of the window member. The photocurable adhesive layer overlaps the photocured bezel layer on a plane and is configured to bind the window member and the display module.

In an exemplary embodiment, the photosensitive material may include at least one of a spiro-naphtho-oxazine compound, a spiro-anthra-oxazine compound, or a spiropyran-based compound.

In an exemplary embodiment, the photosensitive material may include at least one of 1,3-dihydro-1,3,3-trimethylspiro[2H-indole-2,3'-[3H]naphth[2,1-b][1,4]oxazine], 1,3-dihydro-1,3,3-trimethylspiro[2H-indole-2,3'-[3H]phenanthr[9,10-b](1,4)oxazine], bismethyl phenyl diphenyl butatriene, and trinitro fluorenone.

In an exemplary embodiment, the display apparatus further includes an opening through which an image is transmitted, where the opening is on the front face of the window member and defined in the photocured bezel layer.

In an exemplary embodiment, the display module may include a display member configured to produce the image and a touch member configured to sense external input.

In an exemplary embodiment, the touch member may include a plurality of touch sensors and a plurality of signal lines coupled to the plurality of touch sensors and overlapping the photocured bezel layer.

In an exemplary embodiment, on the front face of the window member, the photocured bezel layer may include a first part and a second part opposite each other in a first direction. The photocured bezel layer may further include a third part and a fourth part opposite each other in a second direction which crosses the first direction.

In an exemplary embodiment, the third part may be configured to couple an end of the first part to an end of the second part, and the fourth part may be configured to couple another end of the first part to another end of the second part.

In an exemplary embodiment, a protecting cover may further be included to protect the display module.

In an exemplary embodiment, a method for manufacturing a display apparatus includes: providing a light-transmittable preliminary bezel layer on a surface of a base member, wherein the transmittable preliminary bezel layer overlaps a partial region of the base member and includes a photosensitive material that decreases in transmittance with an increasing amount of irradiating light; providing a photocurable preliminary adhesive layer on a surface of a display module or the surface of the base member; binding the base member and the display module such that the photocurable preliminary adhesive layer overlaps the transmittable preliminary bezel layer, and the photocurable preliminary adhesive layer is disposed between the surface of the base member and the surface of the display module; and irradiating light on a surface of the transmittable preliminary bezel layer which is opposite to the surface of the base member such that the transmittable preliminary bezel layer is cured to forms a bezel layer having a predetermined transmittance.

In an embodiment, during the irradiating of light on the transmittable preliminary bezel layer, the light may be simultaneously irradiated on the photocurable preliminary adhesive layer.

In an embodiment, the method further includes binding a protecting cover to the base member or the display module.

BRIEF DESCRIPTION OF THE FIGURES

The accompanying drawings are included to provide a further understanding of the inventive concept, and are incorporated in and constitute a part of this specification. The drawings illustrate exemplary embodiments and, together with the description, serve to explain principles of the inventive concept. In the drawings:

FIG. 10 is a cross sectional view of another exemplary embodiment of a display member an exemplary embodiment of;

DETAILED DESCRIPTION

Figure 1:
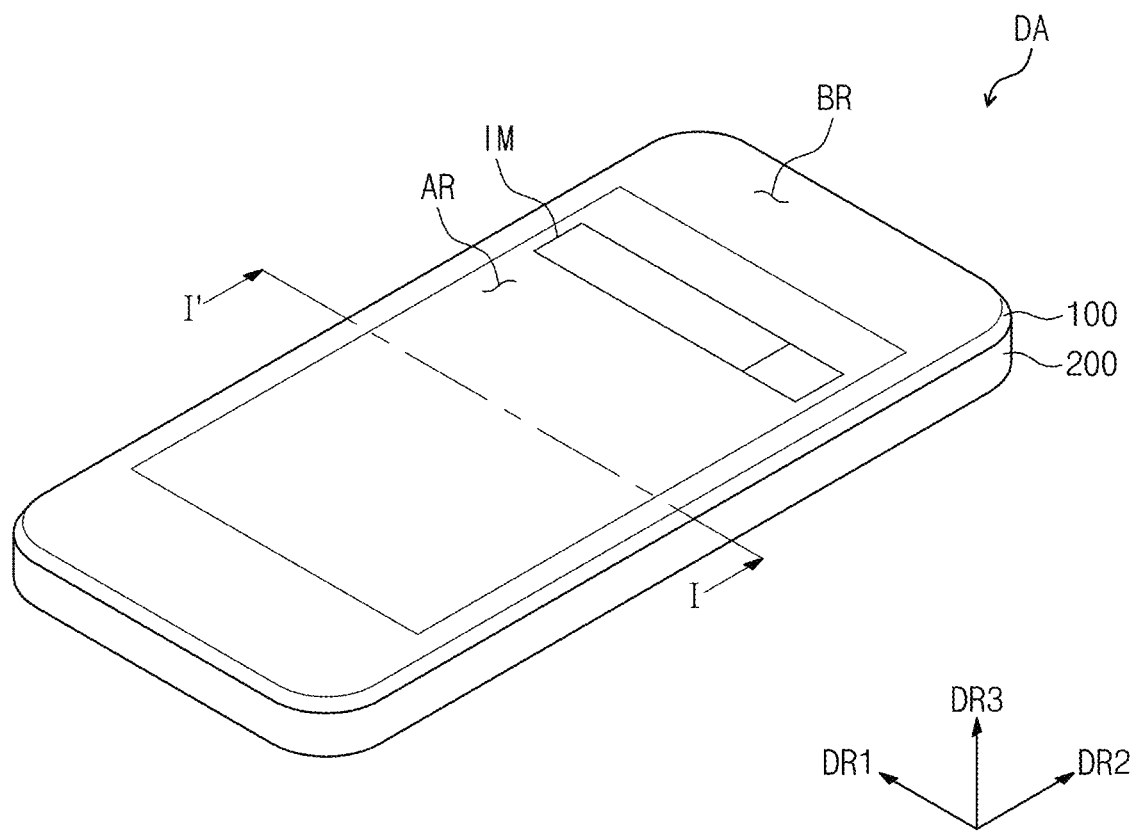
FIG. 1 is a perspective view of an exemplary embodiment of a display apparatus.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

In the drawings, the dimensions of some elements are exaggerated for clarity of illustration of layers and regions. Like reference numerals refer to like elements throughout the specification.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. "Transmittance" and "transmitting" as used herein refers to light transmittance and light-transmitting.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the inventive concept will be described in detail with reference to the accompanying drawings.

Figure 2:
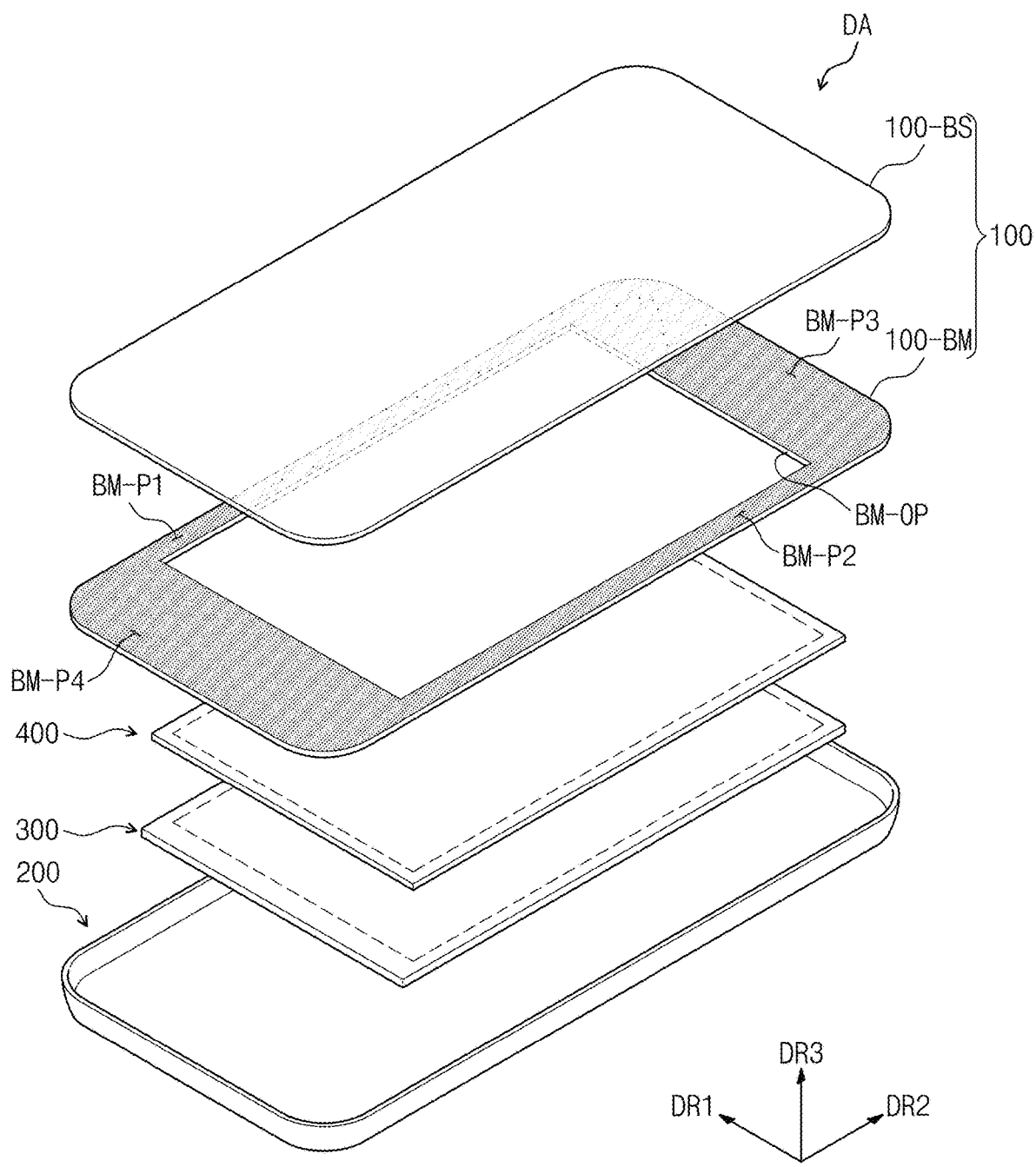
FIG. 2 is an exploded perspective view of an exemplary embodiment of the display apparatus.
Figure 3:
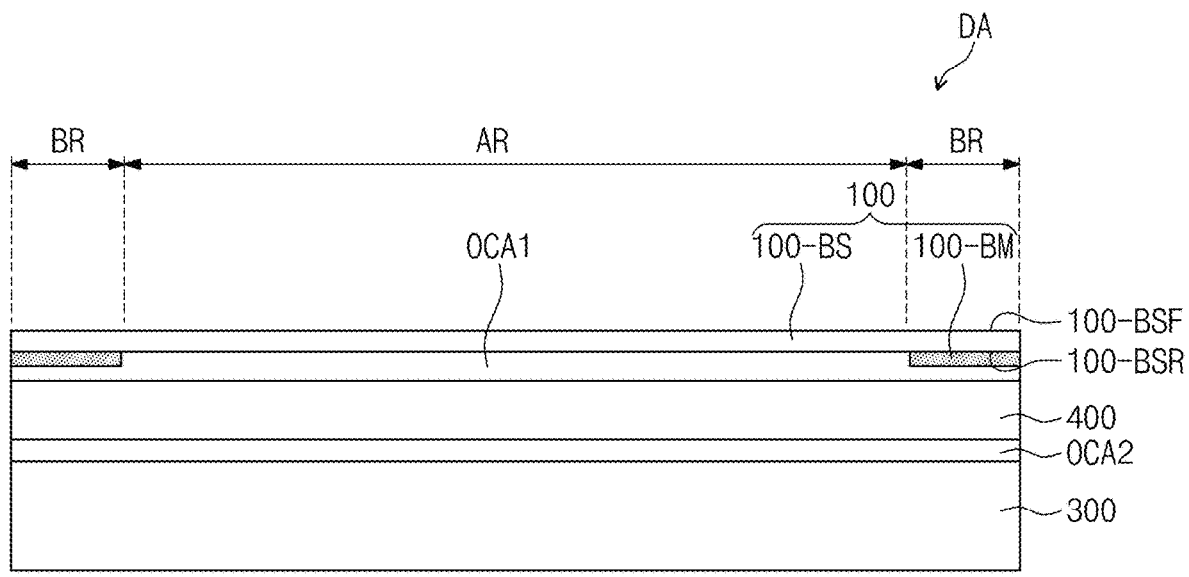
FIG. 3 is a cross sectional view of an exemplary embodiment of the display apparatus.

FIG. 1 is a perspective view of an exemplary embodiment of a display apparatus DA. FIG. 2 is an exploded perspective view of an exemplary embodiment of the display apparatus DA. FIG. 3 is a cross sectional view of an exemplary embodiment of the display apparatus DA along I-I' of FIG. 1. In FIG. 2, optically clear adhesive layers OCA1, OCA2 are not shown. In FIG. 3, a protecting cover 200 is not shown.

A display surface, where an image IM is displayed, is parallel to a surface defined by a first directional axis DR1 and a second directional axis DR2. A normal direction of the display surface is indicated by a third directional axis DR3. The third directional axis DR3 indicates a thickness direction of the display apparatus DA. The front and back faces of each member are distinguished by the third directional axis DR3. However, directions indicated by the first to third directional axes DR1, DR2, DR3 are relative concepts which are changeable into other directions. Hereinafter, the first to third directions refer to the same reference numeral used to refer to the direction respectively indicated by the first to third directional axes DR1, DR2, and DR3. For example, a first direction refers to a direction along the first directional axis DR1, a second direction refers to a direction along the second directional axis DR2, and a third direction refers to a direction along the third directional axis DR3.

As an exemplary embodiment, FIG. 1 depicts a flat display apparatus DA. However, the inventive concept is not limited to the depicted display apparatus, but may also be a curved display apparatus having a certain curvature, a rollable display apparatus capable of being rolled, and a foldable display apparatus capable of being folded. Although not separately depicted, the display apparatus DA of the inventive concept may be used in small and medium electronic devices such as mobile phones, tablets, car navigational systems, game consoles, and smart watches as well as large electronic devices such as televisions and monitors.

As shown in FIG. 1, the display apparatus DA includes a plurality of separated regions on the display surface. The display apparatus DA includes a display region AR configured to display images IM, and a non-display region BR adjacent to the display region AR. The non-display region BR may be a region where images are not displayed. FIG. 1 depicts an internet searching window as an example of an image IM. In an exemplary embodiment, the display region AR may have a rectangular shape. The non-display region BR may surround the display region AR. Shapes of the display region AR and non-display region BR may be relatively designed depending on the desired shape of the display surface. For example, facing parts in a first direction DR1 of the non-display region BR may not be provided, or facing parts in a second direction DR2 of the non-display region BR may not be provided.

As shown in FIGS. 2 and 3, the display apparatus DA includes a window member 100, a protecting cover 200, a display member 300, and a touch member 400. The window member 100, display member 300, and touch member 400 may be separated into regions corresponding to the display region AR and non-display region BR of the display apparatus DA on a plane.

The window member 100 includes a base member 100-BS and a bezel layer 100-BM. The bezel layer 100-BM is disposed on a rear surface 100-BSR of the base member 100-BS to define the non-display region BR of the display apparatus DA. The base member 100-BS may include at least one of a glass substrate, a sapphire substrate, and a plastic substrate.

On the front face of the window member 100, an opening BM-OP, where images IM (see FIG. 1) are transmitted, may be defined in the bezel layer 100-BM. The bezel layer 100-BM may include a first part BM-P1 and a second part BM-P2 opposite each other in the first direction DR1. The bezel layer 100-BM may further include a third part BM-P3 and a fourth part BM-P4 opposite each other in the second direction DR2.

The third part BM-P3 may be configured to couple one end of the first part BM-P1 and one end of the second part BM-P2, and the fourth part BM-P4 may be configured to couple the other end of the first part BM-P1 and the other end of the second part BM-P2. At least one of the first part BM-P1 to the fourth part BM-P4 may not be present. The first part BM-P1 to the fourth part BM-P4 may not be coupled. The planar shape of the bezel layer 100-BM is not limited.

The bezel layer 100-BM may be an organic layer having a certain (i.e., predetermined) transmittance and/or color. The bezel layer 100-BM includes a photosensitive material of which transmittance is reduced as the amount of irradiated light increases. According to the present embodiment, a bezel layer 100-BM without pigments/dyes may be formed by using a material of which color is irreversibly changed in response to irradiated light.

In an exemplary embodiment, the photosensitive material may include at least one of a spiro-naphtho-oxazine compound, a spiro-anthra-oxazine compound, and a spiropyran-based compound.

In an exemplary embodiment, the photosensitive material may include at least one of 1,3-dihydro-1,3,3-trimethylspiro[2H-indole-2,3'-[3H]naphth[2,1-b][1,4]oxazine]), 1,3-dihydro-1,3,3-trimethylspiro[2H-indole-2,3'-[3H]phenanthr[9,10-b](1,4)oxazine], bismethyl phenyl diphenyl butatriene, or trinitro fluorenone.

Although not specifically depicted, the window member 100 may further include a functional coating layer disposed on the front face of the base member 100-BS. The functional coating layer may include at least one of a fingerprint-preventing layer, an anti-reflective layer, and a hard coating layer, etc.

A protecting cover 200 is configured to protect a display member 300 and a touch member 400. The protecting cover 200 is bound to the window member 100 to contain the display member 300 and touch member 400. In an exemplary embodiment, the protecting cover 200 may bind to the display member 300 and the touch member 400.

The protecting cover 200 may include one continuous body which is injected molded or a plurality of assembled parts. The protecting cover 200 may include plastic or metals. In an exemplary embodiment, the protecting layer 200 may not be present.

The display member 300 is configured to produce an image IM corresponding to the inputted image data. The display member 300 may be a liquid crystal display panel or an organic luminescent display panel, however, the type of the display member is not limited.

The touch member 400 is configured to acquire coordinate information of input regions. The display apparatus DA may include the touch member 400 as a resistant membrane type, a capacitance type, or an electromagnetic induction type, however, the type of the touch member is not limited. A detailed description of the touch member 400 will be provided later.

The window member 100 may bind to the touch member 400 via a first optically clear adhesive layer OCA1. In an exemplary embodiment, the first optically clear adhesive layer OCA1 may be a photocurable adhesive layer.

The first optically clear adhesive layer OCA1 may completely overlap with the rear surface 100-BSR of the window member 100. The first optically clear adhesive layer OCA1 may also overlap with the display region AR and the non-display region BR. The first optically clear adhesive layer OCA1 may be disposed on a rear surface 100-BSR of the window member 100 to cover the bezel layer 100-BM. In an embodiment, the first optically clear adhesive layer OCA1 may not be directly disposed on the rear surface 100-BSR of the window member 100, and the first optically clear adhesive layer disposed only on the lower side of the bezel layer 100-BM is sufficient to bind the window member 100 to the touch member 400.

In an exemplary embodiment, the display member 300 and the touch member 400 when bound to each other are defined as a display module. The touch member 400 may bind to the display member 300 via a second optically clear adhesive layer OCA2. The second optically clear adhesive layer OCA2 may be a photocurable adhesive layer, but is not specifically limited thereto. In an exemplary embodiment, the second optically clear adhesive layer OCA2 may be photocurable adhesive layer.

In an exemplary embodiment of the display module, the touch member 400 may not be present. The function of the touch member 400 may be embedded in the display member 300. In an exemplary embodiment, the second optically clear adhesive layer OCA2, configured to bind the touch member 400 and the display member 300, may not be present. For example, the touch member 400 and the display member 300 are manufactured in a continuous process such that the touch member 400 may be directly disposed on the display member 300.

Figure 4:
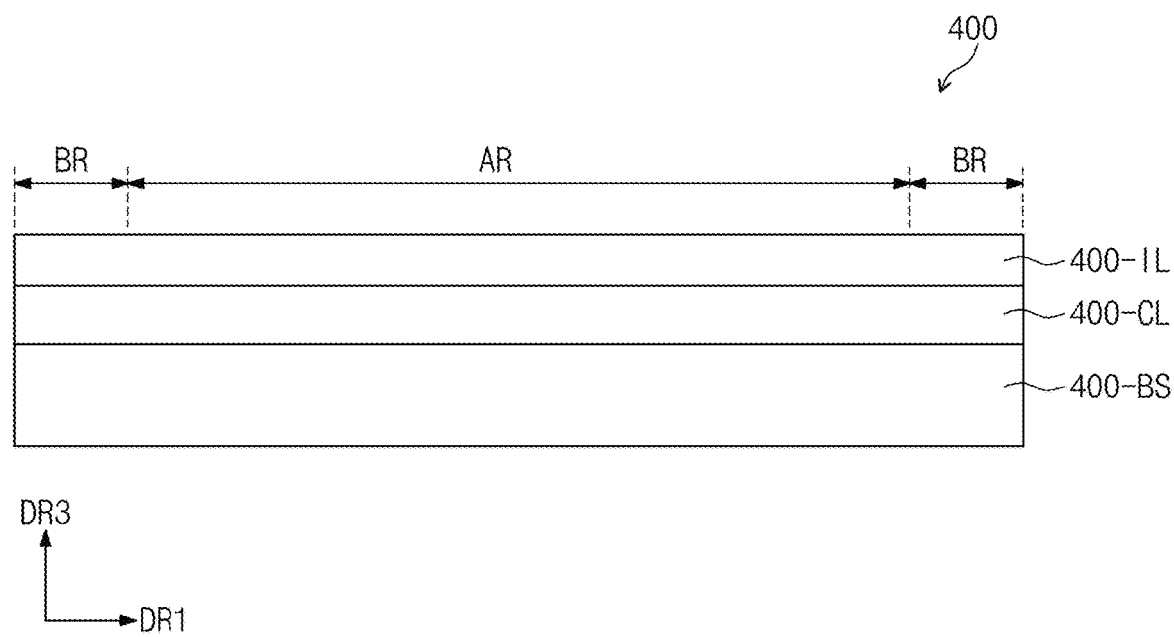
FIG. 4 is a cross-sectional view of an exemplary embodiment of a touch member.
Figure 5:
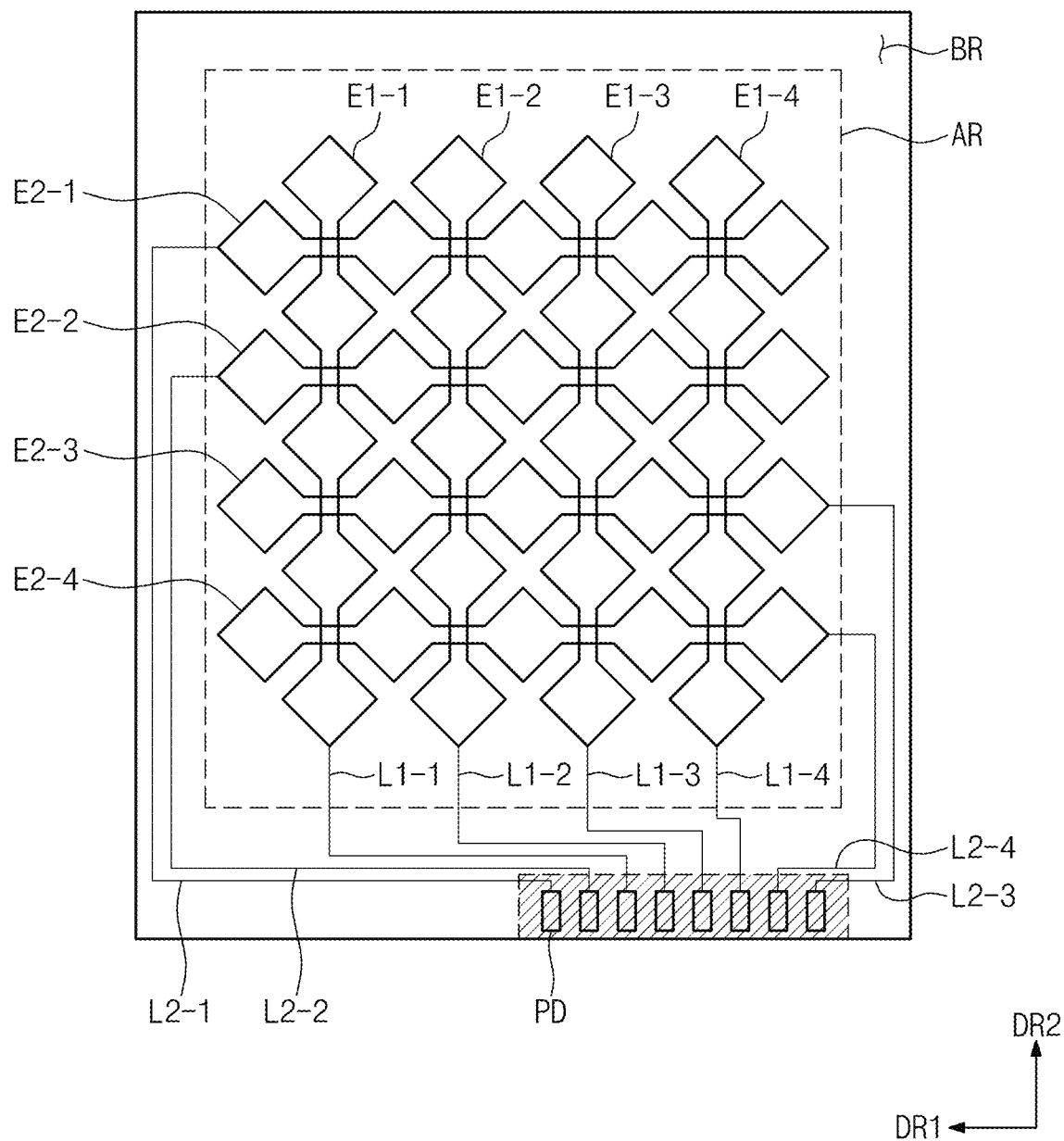
FIG. 5 is a plan view of an exemplary embodiment of the touch member.
Figure 6:
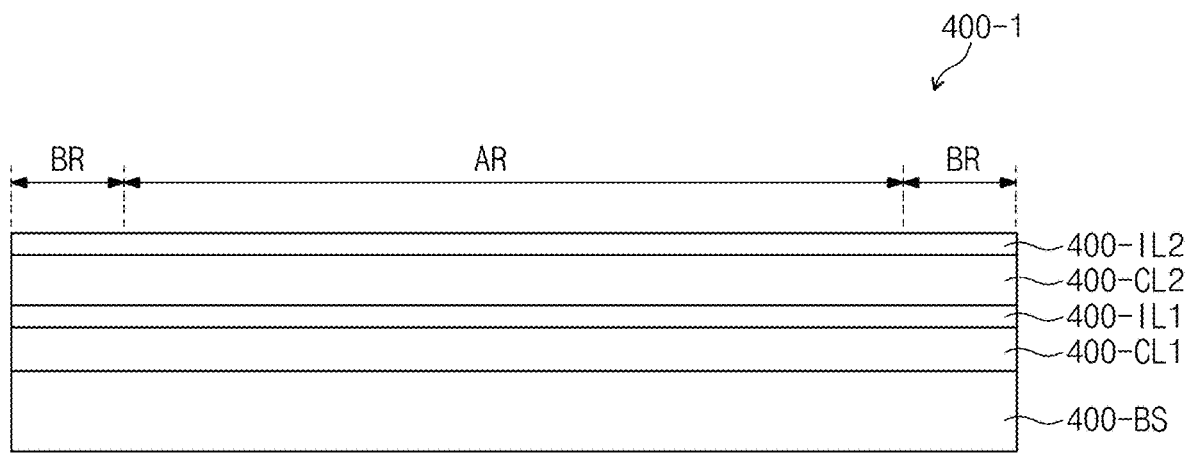
FIG. 6 is a cross sectional view of an exemplary embodiment of the touch member.

FIG. 4 is a cross-sectional view of an exemplary embodiment of a touch member 400. FIG. 5 is a plan view of an exemplary embodiment of the touch member 400. FIG. 6 is a cross-sectional view of an exemplary embodiment of a touch member 400-1. Touch members 400, 400-1 may be separated into a display region AR and a non-display region BR based on a bezel layer 100-BM.

Referring to FIG. 4, the touch member 400 includes a base member 400-BS, a conductive layer 400-CL and an insulation layer 400-IL. In an exemplary embodiment, a monolayer (1-layer) capacitive type touch panel is illustratively depicted in FIG. 4. The monolayer capacitive type touch panel may acquire coordinate information of a touched position in a self-capacitance (self-cap) manner or mutual capacitance (mutual-capacitance) manner. In an exemplary embodiment, the touch member 400 may be changed to a resistant membrane type, an electromagnetism inducing type, etc, and the configuration of the conductive layer 400-CL described below may be changed accordingly.

The conductive layer 400-CL may have a monolayer structure or a multilayer structure laminated along a third directional axis DR3. The conductive layer 400-CL having a multilayer structure may include a transparent conductive layer and at least one metal layer. The transparent conductive layer may include at least one of indium tin oxide (ITO), indium zinc oxide (IZO), zinc oxide (ZnO), indium tin zinc oxide (ITIZO), PEDOT, metal nano wire, and graphene. The metal layer may include at least one of molybdenum, argentum, titanium, copper, aluminum, and an alloy thereof.

The conductive layer 400-CL includes a plurality of patterns disposed on one face (i.e. surface) of the base member 400-BS. The plurality of patterns constitutes a touch sensor and signal line of the touch member 400. The insulation layer 400-IL may be configured to protect a plurality of the patterns or to insulate some patterns among a plurality of the patterns from some other patterns.

Referring to FIG. 5, the touch sensors may include first touch sensors E1-1 to E1-4 and second touch sensors E2-1 to E2-4. The four first touch sensors E1-1 to E1-4 and the four second touch sensors E2-1 to E2-4 are illustratively depicted. The first touch sensors E1-1 to E1-4 and the second touch sensors E2-1 to E2-4 are disposed on the display region AR with overlapping regions.

The first touch sensors E1-1 to E1-4 extend along the second directional axis DR2 and the first touch sensors E1-1 to E1-4 extend along the first directional axis DR1. The second touch sensors E2-1 to E2-4 may insulatively cross the second touch sensors E1-1 to E1-4. In FIG. 5, insulation patterns, which are disposed at crossing points of the second touch sensors E2-1 to E2-4 and the first touch sensors E1-1 to E1-4, are not shown. Each of the crossing parts of the second touch sensors E2-1 to E2-4 may have a bridge shape.

The signal lines include first signal lines L1-1 to L1-4 and second signal lines L2-1 to L2-4. The first signal lines L1-1 to L1-4 are respectively coupled to each end of the first touch sensors E1-1 to E1-4, and the second signal lines L2-1 to L2-4 are respectively coupled to each end of the second touch sensors E2-1 to E2-4. The first signal lines L1-1 to L1-4 and the second signal lines L2-2 to L2-4 are mostly disposed on the non-display region BR with portions overlapping the display region AR. Pads PD, which are coupled to the first signal lines L1-1 to L1-4 and the second signal lines L2-2 to L2-4, may be disposed on the non-display region BR.

The first signal lines L1-1 to L1-4, second signal lines L2-1 to L2-4, and pads PD include a metal material having high conductivity. To prevent external light reflection, the bezel layer 100-BM overlaps with the first signal lines L1-1 to L1-4, second signal lines L2-1 to L2-4, and pads PD.

As shown in FIG. 6, the touch member 400-1 may include the base member 400-BS, a first conductive layer 400-CL1, a first insulation layer 400-IL1, a second conductive layer 400-CL2, and a second insulation layer 400-IL2. Each of the first and second conductive layer 400-CL1, 400-CL2 has either a monolayer structure or a multilayer structure laminated along the third directional axis DR3. The first conductive layer 400-CL1 may include the first touch sensors E1-1 to E1-4, the first signal lines L1-1 to L1-4, the second touch sensors E2-1 to E2-4, and the second signal lines L2-1 to L2-4 depicted in FIG. 5.

Figure 7:
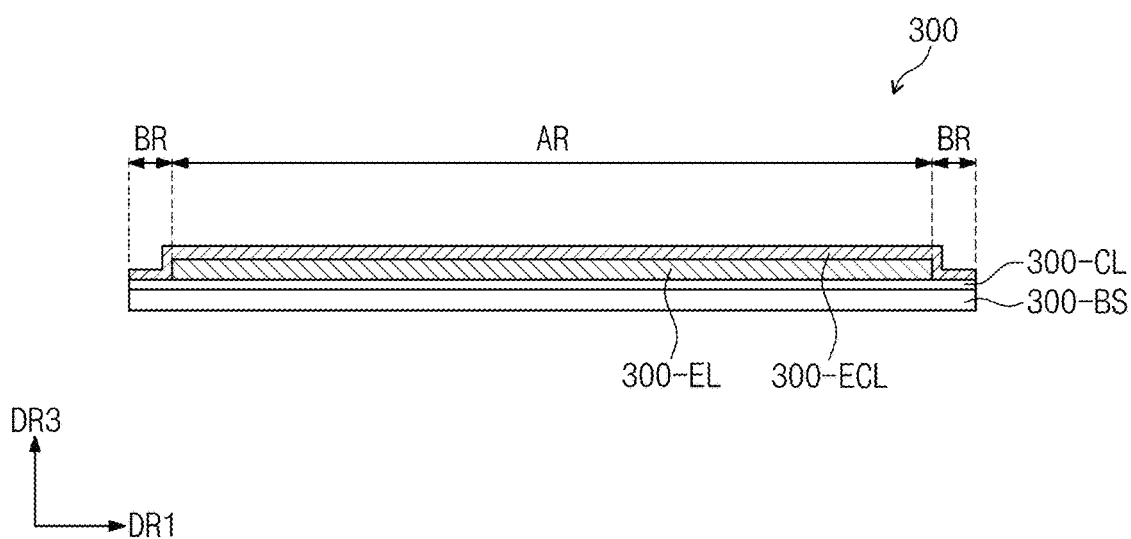
FIG. 7 is a cross sectional view of an exemplary embodiment of a display member.
Figure 8:
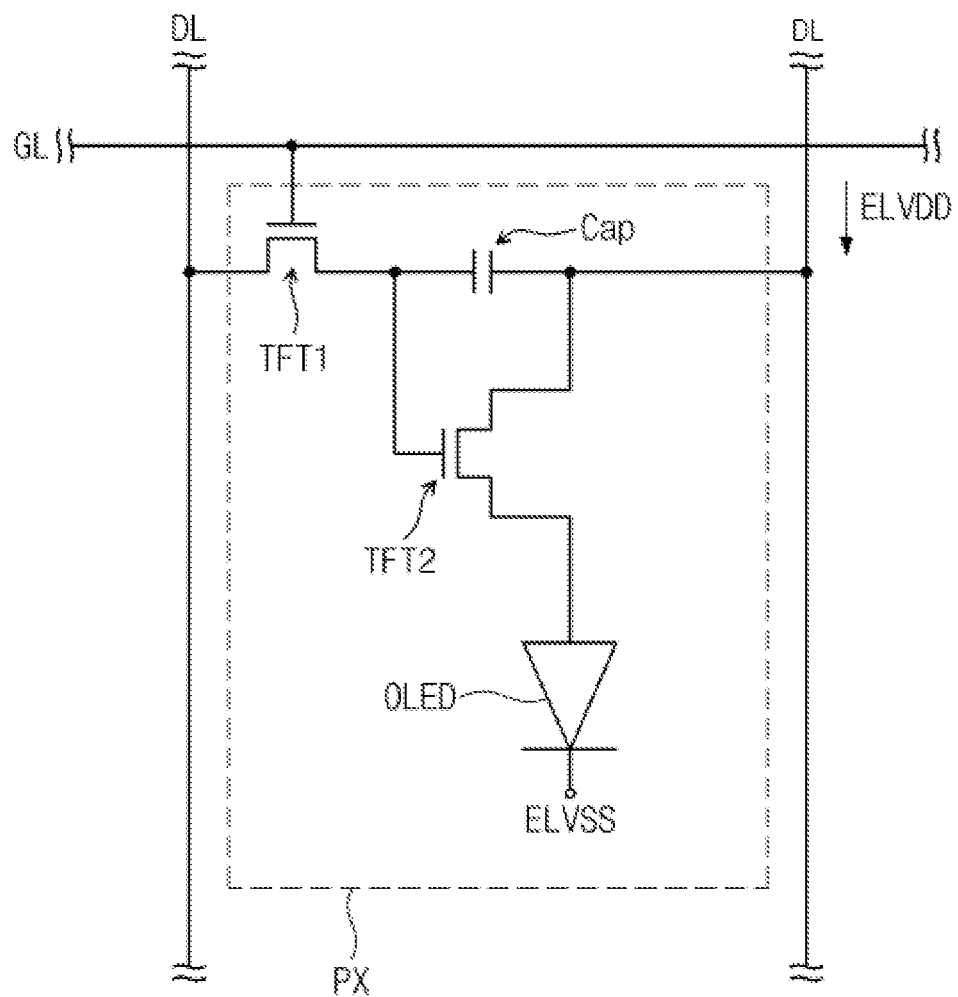
FIG. 8 is an equivalent circuit diagram of an exemplary embodiment of a pixel.

FIG. 7 is a cross-sectional view of an exemplary embodiment of a display member 300. FIG. 8 is an equivalent circuit diagram of an exemplary embodiment of a pixel PX. The display member 300 may be separated into a display region AR and a non-display region BR based on a bezel layer 100-BM.

As shown in FIG. 7, the display member 300 may include a base member 300-BS, a circuit layer 300-CL, a device layer 300-EL, and an encapsulation layer 300-ECL. Although not separately depicted, the display member 300 may further include an optical member disposed on the encapsulation layer 300-ECL. For example, the optical member may be a phase retarding plate or a polarizing plate.

The base member 300-BS may include at least one plastic substrate, glass substrate, or metal substrate, etc. In an exemplary embodiment, the base member 300-BS may include two plastic films, and an inorganic film, such as a silicon nitride film and/or a silicon oxide film disposed therebetween. The base member 300-BS may include at least one of polyimide (PI), polyethylene terephthalate (PET), polyethylene naphthalate (PEN), polyether sulphone (PES), or a glass fiber reinforced plastic (FRP).

The circuit layer 300-CL includes a plurality of signal lines and electronic devices disposed on the display member 300, and a plurality of insulation layers configured to insulate elements of the electronic devices and signal lines. The plurality of insulation layers includes organic and inorganic films.

The plurality of signal lines includes a data line DL and gate line GL coupled to a pixel PX. In FIG. 8, a pixel PX and a corresponding gate line GL and data line DL are illustratively depicted. The electronic devices may include thin-film transistors TFT1, TFT2, and a capacitor Cap which constitute a driving circuit of a pixel PX. The driving circuits of a pixel may be disposed on the display region AR and pads (not shown) coupled to ends of the data line DL and gate line GL may be disposed on the non-display region BR (not shown).

The device layer 300-EL includes display devices. As shown in FIG. 8, the device layer 300-EL includes an organic luminescent (i.e., light-emitting) diode (OLED). The organic luminescent diode emits a light using a first power voltage ELVDD and a second power voltage ELVSS having a different level from that of the first power voltage ELVDD. The device layer 300-EL may further include electronic devices, which are auxiliary to the OLEDs. The element layer 300-EL may be disposed to overlap with the display region AR.

The encapsulation layer 300-ECL is configured to seal the device layer 300-EL. The device layer 300-EL may include a thin-film encapsulation layer (TFE) having a plurality of inorganic thin-films and a plurality of organic thin-films. The encapsulation layer 300-ECL may be disposed to overlap the display region AR and the non-display region BR.

In an exemplary embodiment, the encapsulation layer 300-ECL may be substituted with an encapsulation substrate. The encapsulation substrate is disposed apart from the base member 300-BS with the device layer 300-EL as a center. A sealing agent forms a certain space along perimeter of the encapsulation layer and base member 300-BS.

The base member 400-BS of the touch member 400 (see FIG. 4) is disposed on the encapsulation layer 300-ECL. In an exemplary embodiment, the base member 400-BS of the touch member 400 may not be present, and the conductive layer 400-CL of the touch member 400 (see, FIG. 4) may thus be directly disposed on the encapsulation layer 300-ECL.

Figure 9:
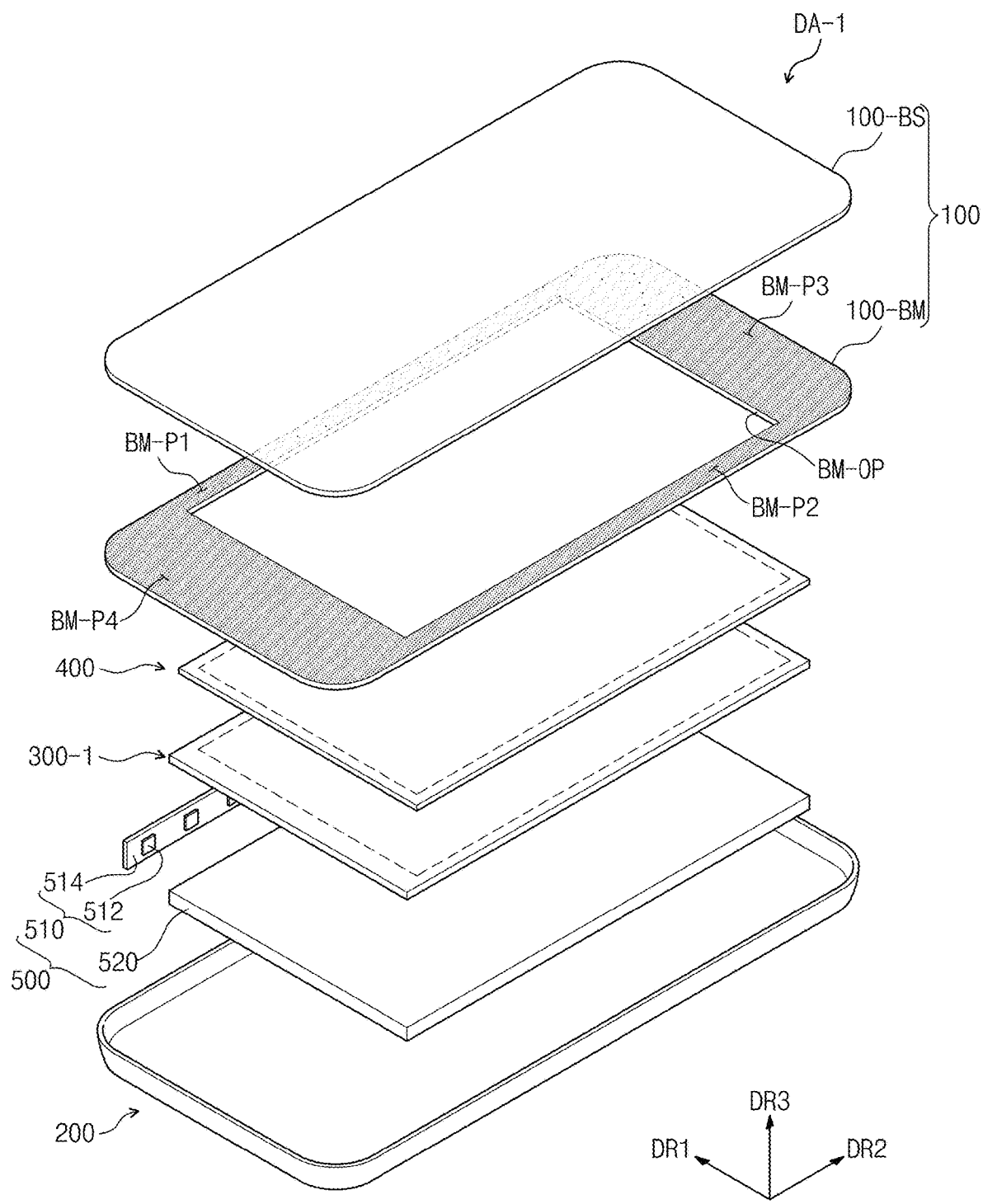
FIG. 9 is a perspective view of an exemplary embodiment of a display apparatus.
Figure 10:
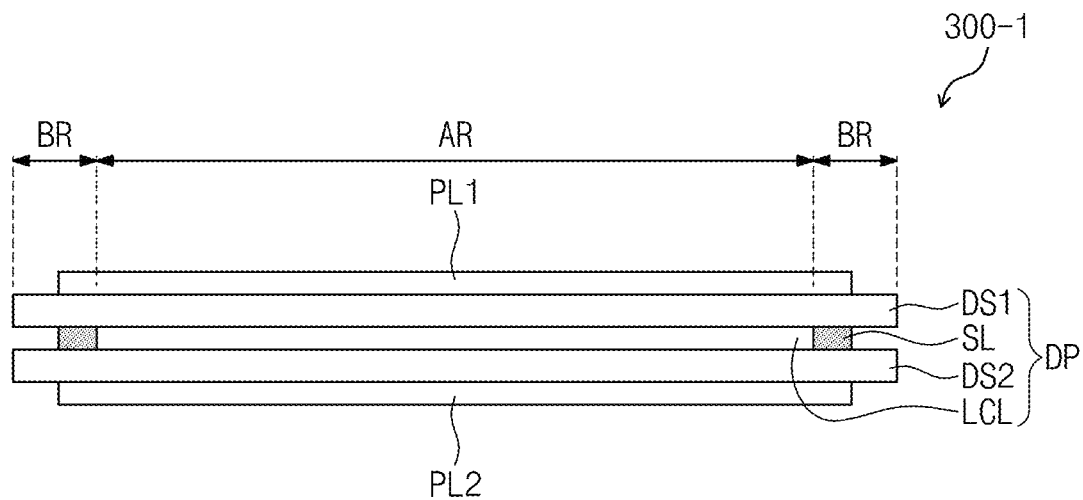
Figure 11:
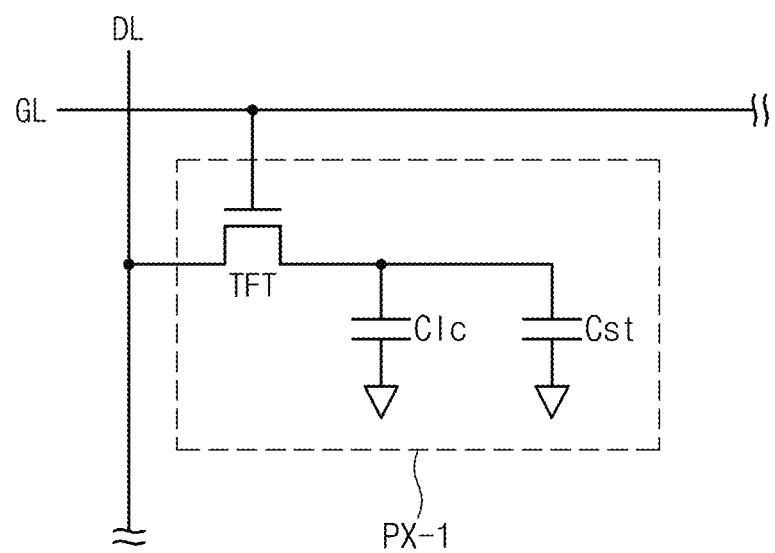
FIG. 11 is an equivalent circuit diagram of another exemplary embodiment of a pixel.

FIG. 9 is an exploded perspective view of an exemplary embodiment of a display apparatus DA-1. FIG. 10 is a cross-sectional view of an exemplary embodiment of a display member 300-1. FIG. 11 is an equivalent circuit diagram of an exemplary embodiment of a pixel PX-1. Referring to FIGS. 9 to 11, the display apparatus DA-1 will be described. Detailed descriptions of the same configurations as those described with reference to FIGS. 1 to 8 are not provided.

In an exemplary embodiment, the display apparatus DA-1 further includes a backlight unit 500. The backlight unit 500 provides a display member 300-1 with light. The display member 300-1 may be a transmittable display panel, but is not specifically limited thereto. In an exemplary embodiment, the display member 300-1 may include a liquid crystal display panel.

In an exemplary embodiment, the backlight unit 500 may be a direct type which includes a light source unit 510 and a light guide plate 520. The light source unit 510 includes light source devices 512 and a circuit substrate 514. Each individual light source device 512 of the light source unit 510 may be an LED package.

The display member 300-1 includes a liquid crystal display panel DP, an upper polarizing plate PL1 and a lower polarizing plate PL2. The liquid crystal display panel DP includes an upper display substrate DS1, a lower display substrate DS2, a sealant SL, and a liquid crystal layer LCL. The upper display substrate DS1 and the lower display substrate DS2 are spaced apart from each other in the third direction DR3, and the liquid crystal layer LCL sealed with the sealant SL is disposed therebetween.

The liquid crystal display panel DP includes a plurality of signal lines and a plurality of pixels. In FIG. 11, an equivalent circuit of an exemplary pixel PX-1 is depicted. The pixel PX-1 includes a liquid crystal capacitor Clc, as a display device and a thin-film transistor TFT as a circuit part. The thin-film transistor TFT is coupled to a gate line GL and a data line DL. In addition, the pixel PX-1 includes a storage capacitor Cst coupled in parallel to the liquid crystal capacitor Clc. In an exemplary embodiment, the storage capacitor Cst may not be present.

FIGS. 12A to D are cross sectional views depicting an exemplary embodiment of a method of manufacturing a display apparatus DA.

Figure 12A:
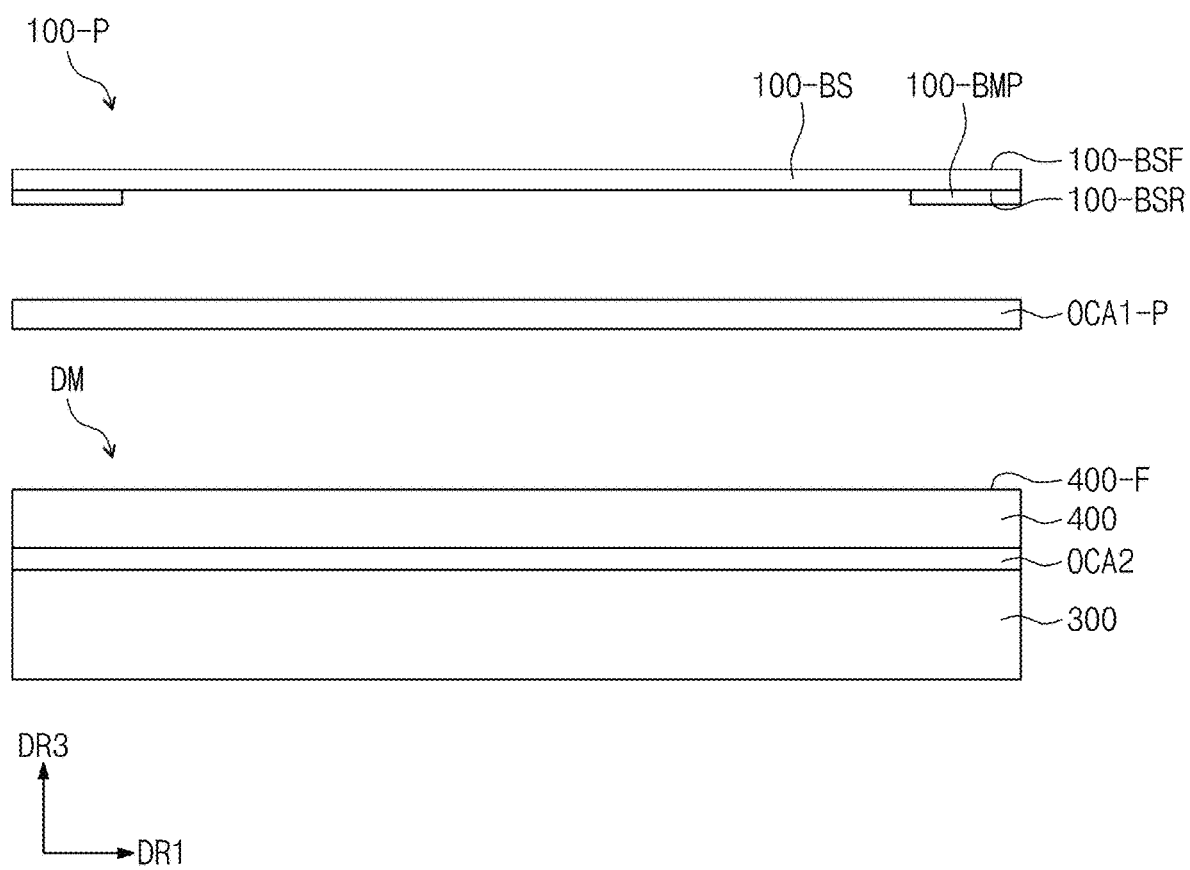
FIGS. 12A to 12D are cross sectional views depicting an exemplary embodiment of a method for manufacturing a display apparatus.

As shown in FIG. 12A, provided are a preliminary (i.e., precursor) window member 100-P and display module DM. The preliminary window member 100-P may be manufactured by forming a transmittable preliminary (i.e., precursor) bezel layer 100-BMP on the rear surface 100-BSR of the base member 100-BS.

The light-transmittable preliminary bezel layer 100-BMP includes the photosensitive material previously described with reference to FIGS. 2 and 3. To form the transmittable preliminary bezel layer 100-BMP, a base mixture including a solvent, a photosensitive material dissolved in the solvent, and other additives (e.g. a photoinitiator) are provided (e.g., coated or printed) on the rear surface 100-BSR using a coating method such as bar coating, gravure coating, and silk screen coating or a printing method such as inkjet printing.

The transmittable preliminary bezel layer 100-BMP may partially overlap with the base member 100-BS and may be formed to have a line shape disposed along perimeter of the rear surface 100-BSR of the base member 100-BS. A planar shape of the transmittable preliminary bezel layer 100-BMP is substantially the same as the shape of the bezel layer 100-BM previously described with reference to FIGS. 2 and 3.

The display module DM may be manufactured by adhering the display member 300 and touch member 400 with an optically clear adhesive layer OCA2. Steps of manufacturing the display member 300 and touch member 400 are not specifically limited.

A photocurable preliminary (i.e., precursor) adhesive layer OCA1-P is provided on a surface of the display module DM or on a rear surface 100-BSR of the base member 100-BS. The surface of the display module DM may be the front surface 400-F of the touch member 400.

The photocurable preliminary adhesive layer OCA1-P may include about 40 weight percent (wt %) to about 60 wt % of a photocurable oligomer, about 20 wt % to about 30 wt % of a photocurable monomer, about 5 wt % or less of a photoinitiator, and other optional additives. An example of other additives may include a lubricant, etc. The photocurable preliminary adhesive layer OCA1-P may be used in a liquid phase form or in a sheet form, but is not specifically limited thereto. The photocurable preliminary adhesive layer OCA1-P in a sheet form further includes a base film (not shown), which is removed prior to cure of photocurable preliminary adhesive layer OCA1-P.

The curing rate of the photocurable preliminary adhesive layer OCA1-P may be increased when a content of a photocurable monomer or a photoinitiator is increased. In addition, by changing a type of the photoinitiator used, the curing rate of the photocurable preliminary adhesive layer OCA1-P may be increased. When hydroxy dimethyl acetophenone is used as a photoinitiator, the photocuring rate may be increased by about two times compared to the case where 2,4,6-trimethylbenzoyl-diphenyl-phosphine oxide is used.

Figure 12B:
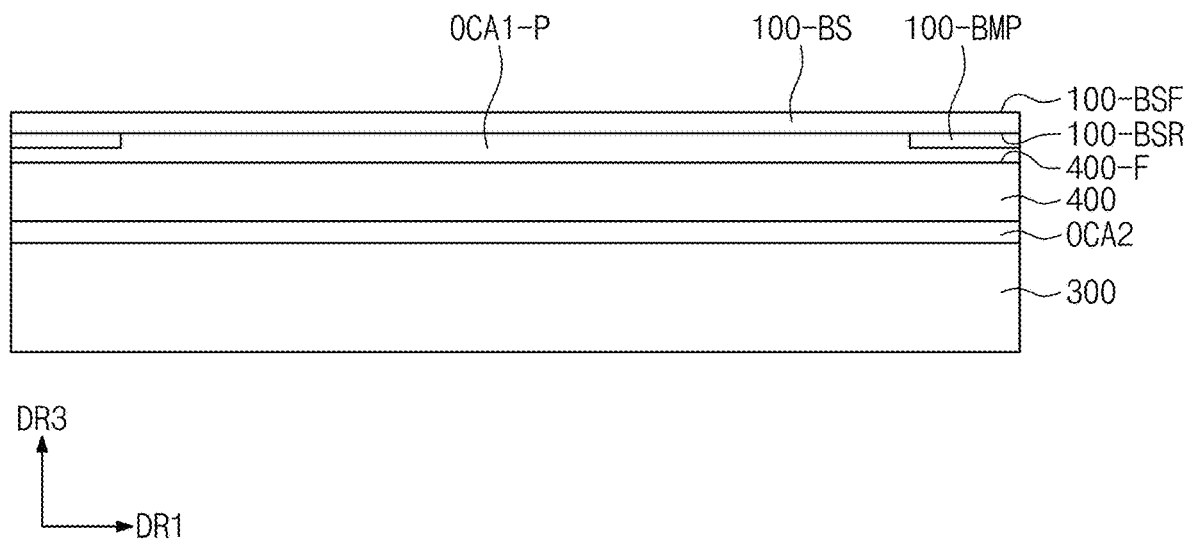

As shown in FIG. 12B, the preliminary window member 100-P and the display module DM are bound such that the photocurable preliminary adhesive layer OCA1-P is disposed between the rear surface 100-BSR of the base member 100-BS and the front surface 400-F of the display module DM. The photocurable preliminary adhesive layer OCA1-P overlaps with the transmittable preliminary bezel layer 100-BMP.

Figure 12C:
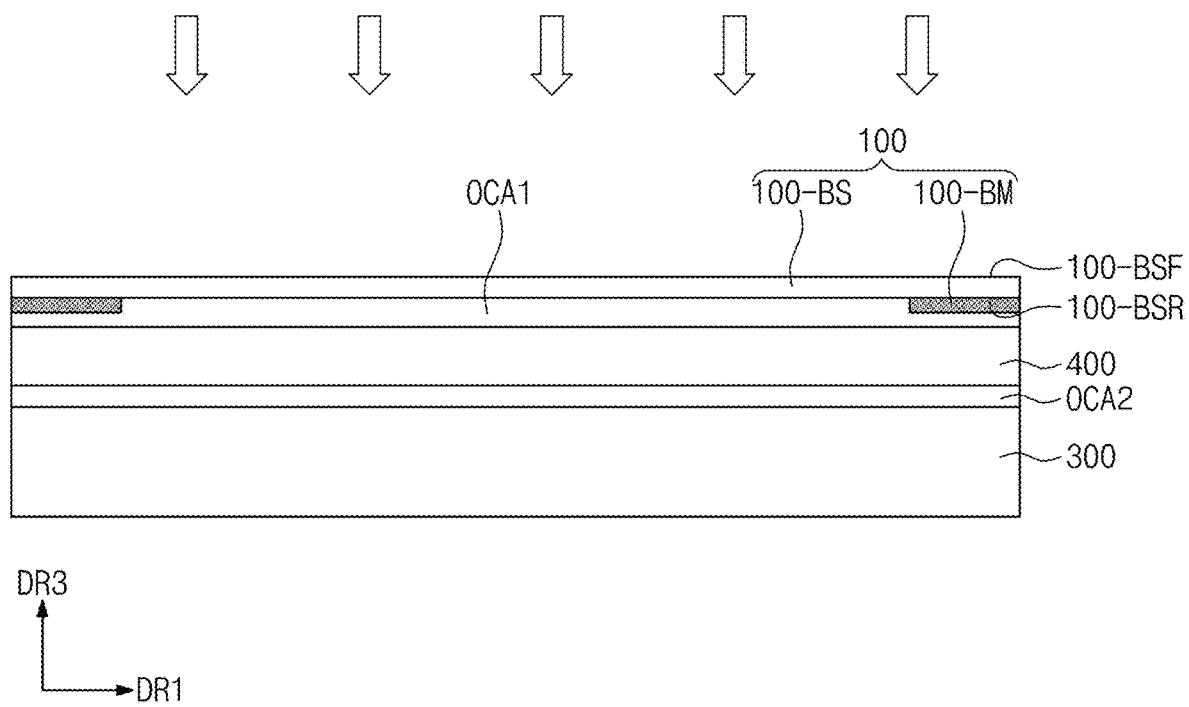

As shown in FIG. 12C, light is irradiated towards the transmittable preliminary bezel layer 100-BMP through the front surface 100-BSF of the base member 100-BS. The irradiated light is a curing light (hereinafter referred to as "curing light") and may be, for example, ultraviolet (UV) light. Curing light is applied to the transmittable preliminary bezel layer 100-BMP and photocurable preliminary adhesive layer OCA1-P, each of which is cured through a photoinitiation. In an initial phase of the curing, the transmittable preliminary bezel layer 100-BMP allows curing light to be transmitted through the layer. Accordingly, curing light is initially provided to some regions of the photocurable preliminary adhesive layer OCA1-P overlapping with the transmittable preliminary bezel layer 100-BMP.

According to an experimental example, Table 1 below shows changes in color, transmittance, and light reaction rate of the transmittable preliminary bezel layer 100-BMP depending upon the amount (dose) of curing light (UV light) applied. The "light transmittance" refers to the percent of light transmitted through the bezel layer after cure at the indicated amount of light; the "light reaction rate" refers to the percent of reactivity remaining in the bezel layer after cure at the indicated amount of light; and the color refers to the color of the bezel layer after cure at the indicated amount of light. Table 1 also shows the percent cure of the photocurable preliminary adhesive layer OCA1-P after cure at the indicated amount of light. Curing of the adhesive layer occurs in those regions overlapping with the transmittable preliminary bezel layer 100-BMP (hereinafter, overlapping region) depending on amounts of curing light.

TABLE 1

| Amount of irradiation of curing light | Transmittable preliminary bezel layer | | | Percent curing of photocurable preliminary adhesive layer |
|---|---|---|---|---|
| | Light reaction rate | Light transmittance | Color | |
| 0 | — | 90% | Transparent | — |
| 200 mJ | 50% | 50% | Light grey | 20% |
| 1000 mJ | 20% | 20% | Dark grey | 100% |
| 1500 mJ | Less than 1% | Less than 1% | black | — |

The photocurable preliminary adhesive layer OCA1-P of the overlapping region may be completely cured before the transmittable preliminary bezel layer 100-BMP is discolored into black and changed into the bezel layer 100-BM (see FIG. 2). For example, the light transmittance of the bezel layer 100-BM can be 20% or less, and the adhesive layer OCA1 completely cured. In an exemplary embodiment, in a sufficiently cured state, the bezel layer has a black color, however the layer may be discolored into red or green depending on the materials used. When sufficiently cured, the bezel layer 100-BM is formed from the transmittable preliminary bezel layer 100-BMP and the optically clear adhesive layer OCA1 is formed from the photocurable preliminary adhesive layer OCA1-P.

As described above, the photocurable preliminary adhesive layer OCA1-P may be sufficiently cured by performing one time of photocuring on the front surface 100-BSF of the base member 100-BS. Since photocuring of the side faces is unnecessary, the manufacturing efficiency of the display DA may be enhanced.

In FIG. 12C, an exemplary embodiment has been described to simultaneously irradiate curing light onto the transmittable preliminary bezel layer 100-BMP and regions of the photocurable preliminary adhesive layer OCA1-P which do not overlap the transmittable preliminary bezel layer 100-BMP (hereinafter, non-overlapping region), however the method is not limited thereto. As needed, it is possible to provide an amount of light to the non-overlapping region of the photocurable preliminary adhesive layer OCA1-P which is different from the amount applied to the transmittable preliminary bezel layer 100-BMP. Alternatively, the light may be provided in a stepwise manner rather than simultaneously.

Figure 12D:
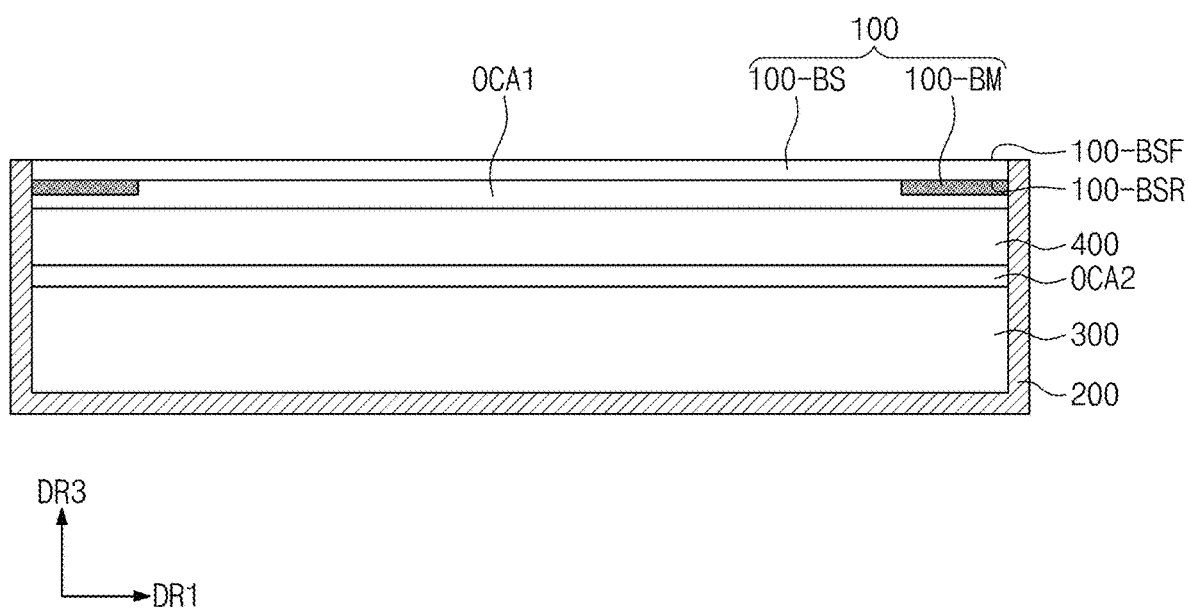

Then, as shown in FIG. 12D, a protecting cover 200 is bound to the base member 100-BS or the display module DM. The protecting cover 200 may bind to the base member 100-BS or display module DM via an adhesive layer (not shown).

As described above, the photocurable adhesive layer is sufficiently cured to reduce the defective rate of the display apparatus.

On the front face of the window member, the photocurable adhesive layer may sufficiently be cured by performing a single photocuring step. Further, since photocuring of the side faces is not necessary, manufacturing efficiency of the display apparatus may be enhanced.

As described above, the photocurable adhesive layer is cured enough to reduce a defective rate of the display.

Through a single application of the photocuring step on the front face of the window member, the photocurable adhesive layer may be sufficiently cured. Since photocuring of side faces is unnecessary, manufacturing efficiency of the display may be enhanced.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A method of manufacturing a display apparatus, comprising:
    providing a light-transmittable, photocurable preliminary bezel layer on a surface of a base member, wherein the preliminary bezel layer overlaps a partial region of the base member and comprises a photosensitive material;
    providing a photocurable preliminary adhesive layer on a surface of a display module or on the surface of the base member;
    contacting the base member and the display module such that the photocurable preliminary adhesive layer overlaps the preliminary bezel layer, and the photocurable preliminary adhesive layer is disposed between the surface of the base member and the surface of the display module; and
    then irradiating light on a surface of the preliminary bezel layer which is opposite to the surface of the base member such that the preliminary bezel layer is cured to form a bezel layer having a predetermined transmittance and the photocurable preliminary adhesive layer is cured to form an optically clear adhesive layer which adheres the base member to the surface of the display module,
    wherein during the irradiating of light on the preliminary bezel layer the light is simultaneously irradiated on the photocurable preliminary adhesive layer, and
    wherein the photocurable preliminary adhesive layer is completely cured to form the optically clear adhesive layer before the preliminary bezel layer is completely cured to form the bezel layer.

2. The method of claim 1, wherein the photosensitive material comprises at least one of a spiro-naphtho-oxazine compound, a spiro-anthra-oxazine compound, and a spiro-pyran-based compound.

3. The method of claim 1, wherein the photosensitive material comprises at least one of 1,3-dihydro-1,3,3-trimethylspiro[2H-indole-2,3'-[3H]naphth[2,1-b][1,4]oxazine], 1,3-dihydro-1,3,3-trimethylspiro[2H-indole-2,3'-[3H] phenanthr[9,10-b](1,4)oxazine], bismethyl phenyl diphenyl butatriene, or trinitro fluorenone.

4. The method of claim 1, further comprising binding a protecting cover to the base member or the display module.

5. The method of claim 1, wherein the preliminary bezel layer has a line shape disposed along the perimeter of the surface of the base member.

6. The method of claim 1, wherein the display module comprises:
    a display member configured to produce an image; and
    a touch member configured to sense external input.

7. The method of claim 1, wherein the irradiating light comprises 1000 to 1500 millijoules of ultraviolet light, and the preliminary bezel layer is cured to form a bezel layer having a transmittance of 20% or less.

* * * * *